United States Patent [19]

Swanson

[11] Patent Number: 4,809,490
[45] Date of Patent: Mar. 7, 1989

[54] SWATH INVERTER

[76] Inventor: Craig K. Swanson, R.R. 2, Box 140, New Richmond, Wis. 54017

[21] Appl. No.: 162,839

[22] Filed: Mar. 2, 1988

[51] Int. Cl.$^4$ ............................................. A01D 78/00
[52] U.S. Cl. ........................................ 56/370; 56/372
[58] Field of Search ................. 56/192, DIG. 21, 366, 56/368, 367, 370, 372, 378, 376; 171/1, 101; D15/27

[56] References Cited

U.S. PATENT DOCUMENTS

| | | | |
|---|---|---|---|
| 2,609,651 | 1/1952 | Cymara | 56/370 |
| 2,667,731 | 2/1954 | Nerness | 56/377 |
| 4,403,468 | 9/1983 | Yoder | 56/370 |
| 4,471,605 | 9/1984 | Euder | 56/372 |

FOREIGN PATENT DOCUMENTS 835359 6/1981 U.S.S.R. ................................ 56/370
927179 5/1982 U.S.S.R. ................................ 56/370

Primary Examiner—John Weiss
Attorney, Agent, or Firm—Henderson & Sturm

[57] ABSTRACT

An agricultural machine operative to pick up, convey and invert a swatch or windrow of hay for the purpose of accelerating the curing thereof. The machine has a mobile frame which carries at its fore part a swath-straddling pick-up which function to pick up the swath bodily and to convey it rearwardly and then obliquely to the line of advance for return to the ground or stubble as an inverted swath ribbon or mat. The oblique conveyor comprises a plurality of parallel, closely side-by-side belts whose upper runs carry the swath ribbon from the pick-up mechanism to a discharge zone at which the discharge ends of the belts are arranged in staggered fashion along a line oblique to the path of travel of the belts.

13 Claims, 3 Drawing Sheets

SWATH INVERTER

BACKGROUND AND SUMMARY OF THE INVENTION

It is well known that field curing of hay is accelerated by turning the swath in such fashion as to place the down side of the swath upwardly so as to expose it to fair weather. Many types of machines have evolved for the purpose of turning, spreading and inverting the hay, such as tedders, side rakes, dump rakes and the like. More recently, special swath inverters have been developed which, if properly designed and operated, have many advantages over prior tedding and raking practices.

According to the present invention, a properly designed swath inverter is provided in the form of a mobile frame adapted to advance over a field of hay previously harvested and left lying in swath fashion, for example, on the field. The machine may be typically drawn by a tractor and carries a pick-up mechanism of such width as to straddle a swath so as to pick up the swath bodily from the field as a ribbon or mat and to deliver such ribbon rearwardly to a transfer area for entry onto a cross conveyor whose length is oblique to the line of advance so as to lead to a discharge zone disposed both laterally outwardly and rearwardly of the pick up Moving belts on the conveyor terminate in discharge ends that are staggered along a line disposed at an obtuse angle to the oblique disposition of the cross conveyor so that the swath ribbon, upon engagement with the ground or stubble of a previous swath, becomes inverted as the machine advances, whereby the down side of the swath ribbon becomes its top side and is thus exposed to fair weather elements.

It is a feature of the invention that the swath ribbon is narrowed in width as respects the width of the picked-up ribbon as it turns the corner at the transfer area so that the inverted swath is narrower than the swath yet to be picked up. In this respect it is also a feature to provide means for increasing the width of the swath ribbon as it leaves the belts at the discharge zone.

A further feature resides in arranging the swath-conveying belts on the cross conveyor in side-by-side relation with only running clearance between neighboring belts, an arrangement which moves the swath ribbon efficiently and without a waste of energy and loss of leaves.

A significant feature flows from the staggered arrangement of the discharge ends of the belts along a line that provides a natural angle of inversion of the swath ribbon without tearing or otherwise disturbing the nature of the ribbon, whereby the leaves are sheltered from shattering during inversion and are further shaded by the stems from direct rays of the sun when deposited onto the field.

Further features and advantages of the invention will become apparent to those versed in the art as a preferred embodiment of the invention is disclosed in the ensuing description and accompanying drawings

DETAILED DESCRIPTION OF A PREFERRED EMBODIMENT OF THE INVENTION

Figure 1:
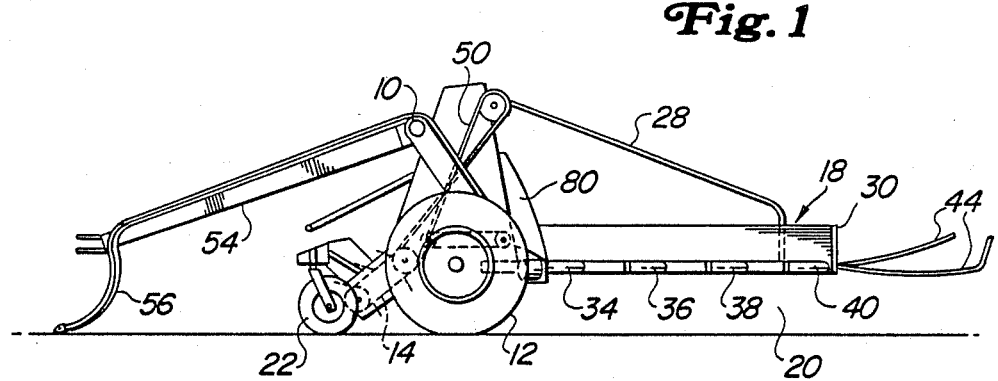
FIG. 1 is a side elevation of the inverter machine.

The inverter is made up of a mobile frame (10) having wheels (12) and carrying swath-gathering means including a swath-straddling pick-up mechanism (14) which picks up swath bodily from the field and transfers it rearwardly as a swath ribbon or mat to a transfer area (16) from whence the ribbon moves onto a cross conveyor structure (18) which has its length disposed obliquely to the line of advance of the machine so as to extend both rearwardly and laterally outwardly of the line of advance, the rear or outer end of the cross conveyor ending at a discharge zone (20) spaced above the ground so that the swath ribbon descends thereat to the ground or stubble and becomes inverted; i.e., turned upside down More specifically, the pick-up (14) has right and left fore-and-aft sides, (14R) and (14L), respectively, and is disposed with its length fore and aft and is supported in part on its own wheels (22) and further has a width transverse to the line of advance sufficient to pick up a relatively wide swath; e.g., on the order of five to six feet. The pick-up is operative to pick up the swath bodily and gently and to convey it rearwardly in ribbon or mat fashion via rearwardly running belt or draper means (24) to the transfer area (16), the swath ribbon moving thereat to the cross conveyor (18). As used here, the terms "right" and "left" are as seen by an observer standing behind the machine and looking forwardly. The cross conveyor is shown and described as moving from right to left in accordance with accepted practices of moving the swath from right to left in known machines such as side rakes and the like.

Figure 5:
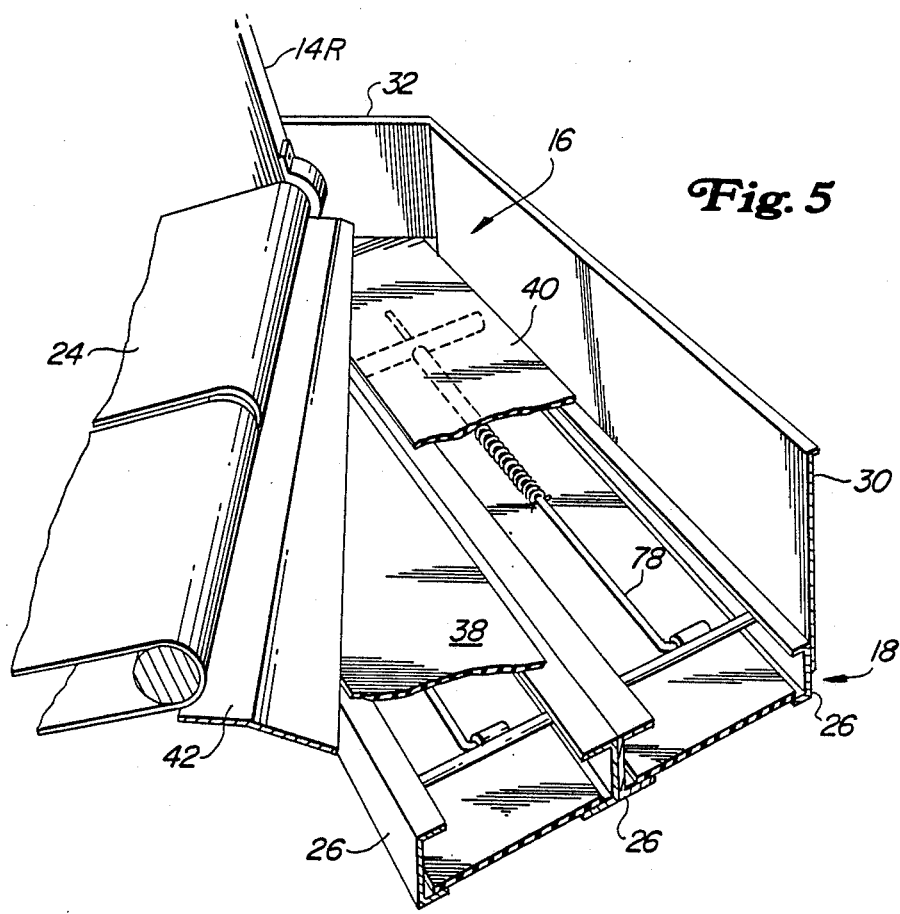
FIG. 5 is a fragmentary perspective, on an enlarged scale, showing the transfer area between the pick-up conveyor and the cross conveyor.

As best seen in FIG. 5, the cross conveyor includes an elongated structure made up of frame elements (26) disposed in parallel relation to each other but at an obtuse angle to the line of advance of the machine so that the cross conveyor as a unit extends obliquely from the transfer area (16) to the discharge zone (20). Attachment of the inner end of the cross conveyor to the frame (10) may be achieved in any fashion so that the cross conveyor is carried at its inner end by the frame (10); although, support of the cross conveyor may be enhanced by a generally fore-and-aft disposed bar or pipe (28) that is fixed at its front end to the frame (10) and at its rear end to the remote end of the cross conveyor. The cross conveyor is provided with means for compelling the swath ribbon to move through the transfer area (16) to the cross conveyor, which means here comprises an upright shield or wall (30) fixed to and rising from the rear conveyor member (26) and extending the length of the conveyor. This wall has an angled part (32) at its inner or right end which projects forwardly alongside the right-hand end of the draper (24).

Figure 2:
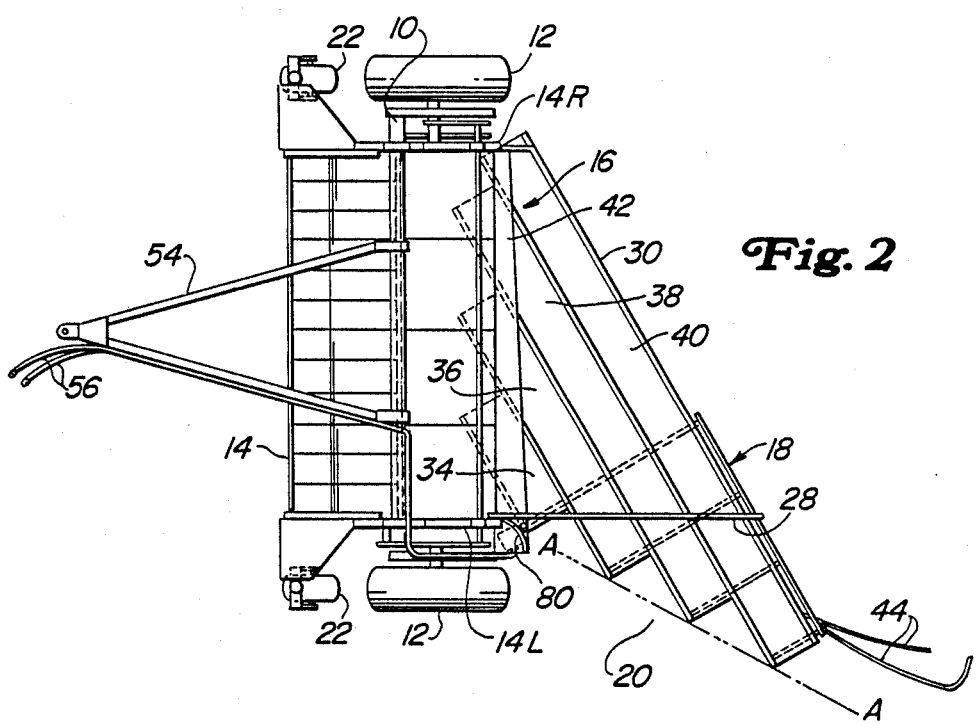
FIG. 2 is a plan view of the machine.

The frame parts of the cross conveyor (18) carry a plurality of endless belts, here four in number, identified, from front to rear, as (34), (36), (38) and (40). The belts have their inner ends in position to receive swath ribbon from the pick-up draper and have their upper runs coplanar with each other and their lengths parallel to each other and to the length of the cross conveyor structure (18), but the belts are progressively of increasing length from front to rear so that their outer or discharge ends are staggered along a line A—A that establishes an angle of inversion, here at an obtuse angle on the order of about 140° to the length of the cross conveyor which itself is disposed at an obtuse angle on the order of about 120° to the fore-and-aft centerline or the line of advance of the machine. Angles of this general range have proven to give excellent results in practice. The staggering of the discharge ends of the belts at the discharge zone (20), best seen in FIG. 2, disposes the discharge end of each of the belts (36), (38) and (40) rearwardly and laterally outwardly of its forwardly disposed neighbor. To be noted also is that the combined span of the inner ends of the belts is about equal to the width of the draper (24) at the transfer area (16), which means that the transfer area is the width of the draper part of the pick-up. Thus, the swath ribbon flows of the rear or delivery end of the draper (24) to the belts, the transfer being facilitated by a crop shield (42), preferably of smooth sheet metal and tapered as shown so as to extend and diverge from the right hand end of the conveyor (18) to about the discharge end of the shortest belt (34). The cross sectional shape of the shield is that of an inverted V (FIG. 5). The shield may be affixed to the frame structures in any suitable manner and, overlying the inner parts of the belts, serves to prevent carry-over of the swath ribbons about the draper and without wrapping about the idler rollers (not shown) at the inner ends of the belts, thus contributing to the smooth flow of the swath ribbon in its transition from its for-and-aft path to its oblique path.

As the swath ribbon descends from the belts at the discharge zone and becomes inverted via the inversion angled A—A, it will have been narrowed by at least the extent to which the width of the cross conveyor is less than that of the draper (24), assuming that the swath picked up is of such dimension as to extend completely—or substantially completely—across the draper. In such case, the narrowed swath will have become of increased vertical dimension or thickness, at least partly from turning the corner, so to speak, as it moves to and along the cross conveyor by the belts via a rolling action as it narrows in the cross. As the machine advances, the swath ribbon deposited on the stubble becomes inverted. In extreme cases, inversion will be assisted by flipping rods (44) affixed to and extending rearwardly from the outer end of the conveyor structure (18).

Figure 3:
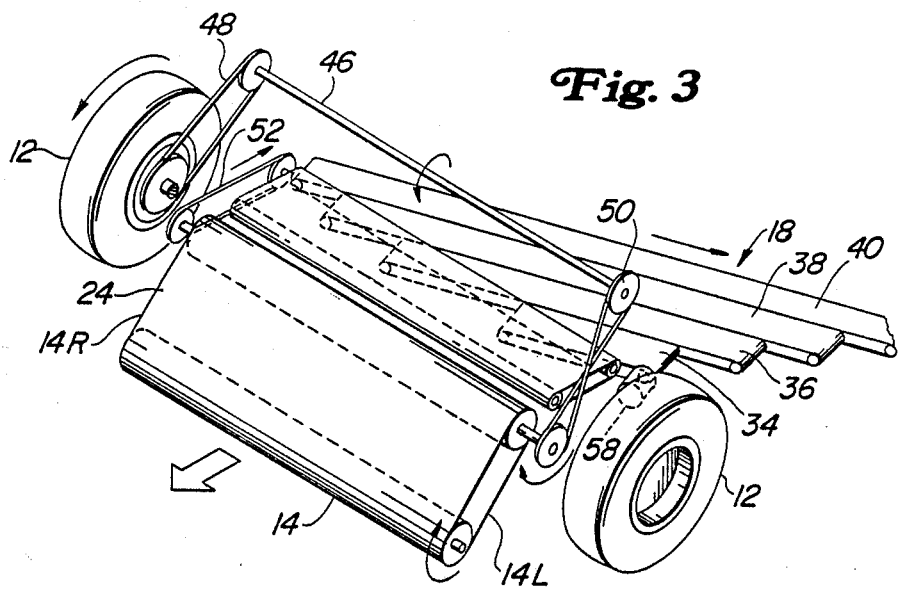
FIG. 3 is a perspective of the machine with frame parts omitted to better show the drive mechanism.
Figure 4:
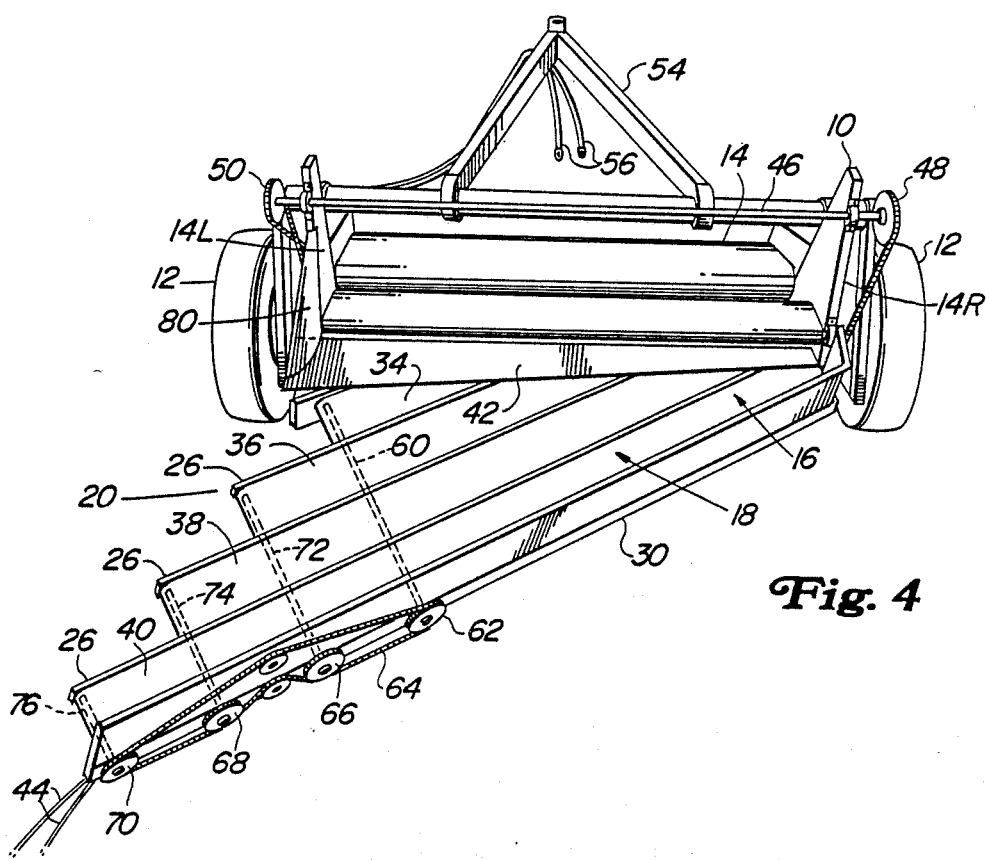
FIG. 4 is a perspective of the machine as seen from the rear and above.

FIG. 3 shows a representative drive for the moving parts of the machine. A cross shaft (46) is belt-or-chain driven at (48) from the right hand wheel (12) and at its left hand end provides part of a crossed-belt drive (50) to the pick-up. The rear or top shaft of the pick-up extends at its right hand end to drive the rear roller of the draper (24) via a belt (52). The frame (10) includes a tongue (54) for connection to a tractor (not shown) and hydraulic hoses appear at (56) for deriving fluid pressure from the usual hydraulic system of such tractor. This arrangement enables the use of a hydraulic motor (58) for driving the belts of the cross conveyor (18) As will be apparent (FIGS. 3 and 4), the motor drives a shaft (60) for the belt (34), and this shaft extends to the rear between the runs of the belts to drive a sprocket (62) which, via a chain (64) and suitable idlers, drives sprockets (66), (68) and (70) for belt drive shafts (72), (74) and (76) respectively for the belts (36), (38) and (40).

Figure 6:
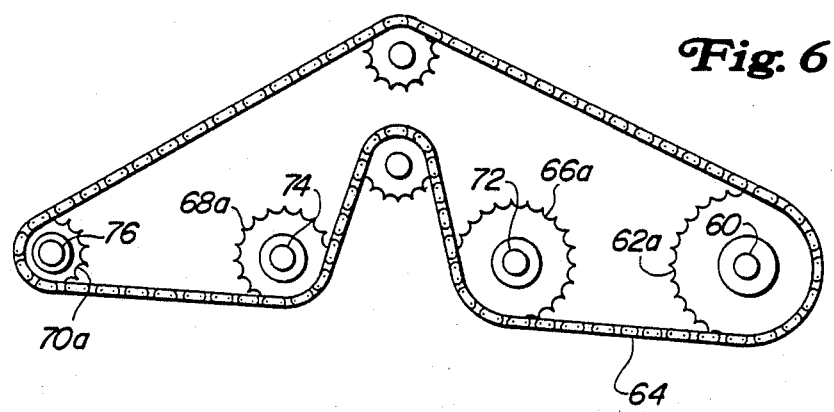
FIG. 6 is a schematic showing a different arrangement of drive components to obtain variations in belt speeds.

In one form of the invention, the sprockets just described are sized so that the belts run at the same speed, thus carrying and discharging the swath ribbon to the discharge zone (20) in such fashion as to deposit the inverted swath ribbon on the stubble in a predetermined width. As a variation of this mode, the diameters of the sprockets may be varied as respects each other, causing the belts to run at different speeds and thus varying the width of the inverted swath. For example if the sprockets are selected so that the belts rearwardly of the belt (34) run at speeds progressively faster than the belt (34), the swath will become wider because the fast belts tend to throw progressively rearward portions of the swath father beyond the line A—A; i.e., farther to the left of the left hand wheel of the machine. Conversely, if the belts are run progressively slower, a narrower inverted swath ribbon will result. For example, as seen in FIG. 6, sprockets (62a), (66a), (68a) and (70a) are of such relative diameters as to obtain belt speeds of different rates.

FIG. 5 illustrates the use of a belt tightener (40), which is typical of all the belts. When properly adjusted, the upper runs of the belts move smoothly to their respective discharge ends. Since the belts are closely spaced, there is little if any real room between them for dragging of the swath on stationary parts of the conveyor, thus resulting in an efficient use of the available power.

An advantage of the machine is that it will handle either wide or narrow swaths. Because of the width-to-width relationship between the draper (24) and the cross conveyor, wider swaths moving at the transfer area will be narrowed, whereas narrow swaths coming up the draper, if as wide as or narrower than the cross conveyor, will not be narrowed. Thus, the machine will be seen as being highly versatile. Its rather simple construction makes for easy mobility and maintenance and is initially relatively low cost to manufacture. A further advantage of the machine is the fore-and-aft pick-up that attacks the swath "on line"; i.e., along the line of advance of the machine which is essentially the line along which the swath was laid by the preceding mower, for example. This enables the swath to be picked up as a ribbon rather than tearing at the edges of the swath were the swath approached cross-wise, for example. Further, the angle of inversion at A—A begins in line with the left-hand edge of the pick-up. Looking at FIG. 2, it will be seen that the cross conveyor increases in width from right to left. This in combination with the efficient belts enables the movement of substantial amounts of hay, another feature leading to the overall versatility of the machine. The relationship of the oblique cross conveyor (18) to the gathering means 14–24 is such that the inner end of the cross conveyor spans the width of the draper at the transfer area, and further the discharge end of the front or shortest belt has its discharge end substantially in fore-and-aft alignment with the left side 14L of the pick-up and draper means. In this area, the frame (10) carries an upright shield (80) which functions to prevent entanglement of the discharged swath with the left hand wheel and related mechanism at the left hand side of the machine.

Features and advantages other than those pointed out herein will become apparent to those versed in the art, as will many modifications in and additions to the preferred embodiment disclosed, all without departure from the spirit and scope of the invention.

I claim:

1. A swath-inverting machine comprising a mobile frame adapted to travel over a field along a line of advance following field-borne swath, pick-up means carried by the frame and having right and left sides spaced apart transversely so as to straddle the swath and including a fore part transverse to the line of advance, a rear part transverse to the line of advance and defining a transfer area having right and left sides respectively in substantial fore-and-aft alinement with the right and left sides of the pick-up means, and swath-handling elements operative to pick up the swath bodily from the field as a ribbon and to move the swath ribbon rearwardly to and over said transfer area, cross conveyor structure carried by the frame rearwardly of the pick-up means and extending obliquely rearwardly and leftwardly at an obtuse angle to the line of advance and having an inner end proximate to and for receiving the swath ribbon from the transfer area and further having an outer end portion disposed rearwardly and leftwardly of said inner end and providing a discharge zone disposed rearwardly and leftwardly beyond the left side of the pick-up means, said structure further including a set of endless belts disposed obliquely as aforesaid in closely parallel side-by-side relation and respectively having coplanar upper runs movable from the transfer area to the discharge zone for carrying the swath ribbon to and over said discharge zone, the set of belts including a forward belt having a discharge end spaced above the ground at the discharge zone and a rearward belt having a discharge end also at said zone and similarly spaced above the ground but offset both leftwardly and rearwardly of the discharge end of the forward belt, said conveyor structure including an upright rear wall rising from the plane of the upper runs of the belts closely rearwardly of and parallel to the rearward belt and extending from the right side of the transfer area to the discharge end of the rearward belt, said wall being operative to turn the swath ribbon left-ward to be carried by the belts to the discharge zone for causing inversion of the swath ribbon as it leaves the discharge ends of the belts and engages the ground as the machine continues its advance.

2. A machine according to claim 1, including a swath shield transverse to the line of advance and disposed at the transfer area in closely overlying relation to those portions of the upper runs of the belts proximate to the transfer area.

3. A machine according to claim 2, in which the shield extends laterally to a terminal portion approximately at the conveying means discharge zone.

4. A machine according to claim 2, in which the shield, is generally of inverted V shape in section.

5. A machine according to claim 4, in which the shield has front and rear edges that diverge laterally outwardly from the transfer area.

6. A machine according to claim 1, including a generally fore-and-aft support connected to the frame and extending rearwardly over the belts and connected to the outer end portion of the conveyor structure.

7. A machine according to claim 1, including elongated swath-flipping elements carried by and extending from the conveyor structure both rearwardly and laterally outwardly of the discharge zone and operative downwardly on the discharged inverted swath.

8. A machine according to claim 1, in which the cross conveyor structure includes at least a third belt parallel to and intermediate the forward and rearward belts and having an upper run coplanar with the upper runs of the other belts and further having a discharge end at the discharge zone spaced above the ground like the other belts but offset both laterally outwardly and rearwardly of the forward belt and laterally inwardly and forwardly of the rearward belt, the discharge ends of the belts lying generally on a line at an obtuse angle to the oblique disposition of the cross conveyor structure.

9. A machine according to claim 1, in which the discharge end of the first belt is substantially in fore-and-alignment with the left side of the swath-gathering means.

10. A machine according to claim 1, in which the rear part of the swath-gathering and moving means is disposed rearwardly uphill from the fore part so as to dispose the transfer area at an elevation higher than the inner end of the cross- conveyor structure.

11. A machine according to claim 1, including means for driving the belts at relatively different speeds.

12. A machine according to claim 1, including an upright fore-and-aft shield carried by the frame in substantial fore-and-aft alinement with the left side of the transfer area.

13. A machine according to claim 1, in which the combined span of the portions of the belts proximate to the transfer area is substantially equal to the width of the pick-up means.

* * * * *